United States Patent

[11] 3,562,533

[72] Inventors Walter M. Doyle, Laguna Beach; Wesley Duane Gerber, Santa Ana, Calif.
[21] Appl. No. 731,376
[22] Filed May 23, 1968
[45] Patented Feb. 9, 1971
[73] Assignee Philco-Ford Corporation
Philadelphia, Pa.
a corporation of Delaware

[54] VARIABLE POLARIZATION OPTICAL HETERODYNE TRANSCEIVER
8 Claims, 2 Drawing Figs.

[52] U.S. Cl.................................................. 250/199, 350/147
[51] Int. Cl..................................................... H04b 9/00
[50] Field of Search............................................ 250/199; 356/4, 5; 330/4.3; 332/7.51; 350/147, 152, 157

[56] References Cited
UNITED STATES PATENTS

| | | | |
|---|---|---|---|
| 3,401,590 | 9/1968 | Massey...................... | 356/5 |
| 3,407,364 | 10/1968 | Turner....................... | 330/4.3 |
| 3,418,476 | 12/1968 | Mueller et al............... | 250/199 |
| 3,426,286 | 2/1969 | Miller........................ | 330/4.3 |

Primary Examiner—Richard Murray
Assistant Examiner—Benedict V. Safourek
Attorney—Robert D. Sanborn ABSTRACT: A laser system that utilizes a single laser as a transmitter, a local oscillator and a preamplifier. The polarizations of the normal laser oscillations and the polarization of the received signal are made different so that the received signal in passing through the laser alters the polarization of the laser output signal. Means are provided for converting the polarization modulation into an electrical signal representative of the modulation of the receiver signal.

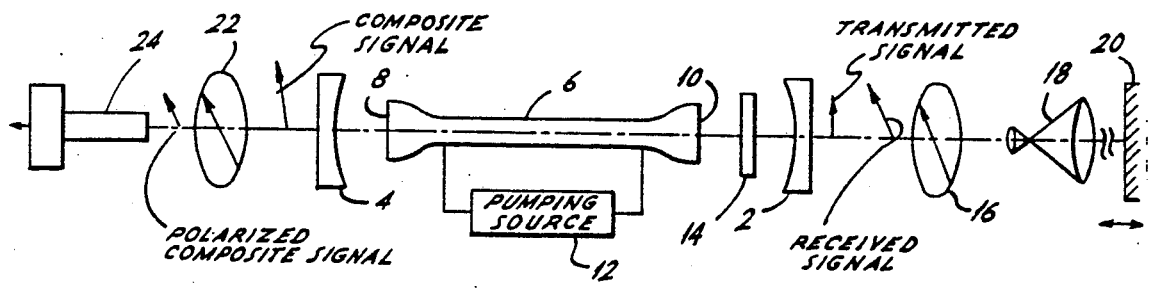
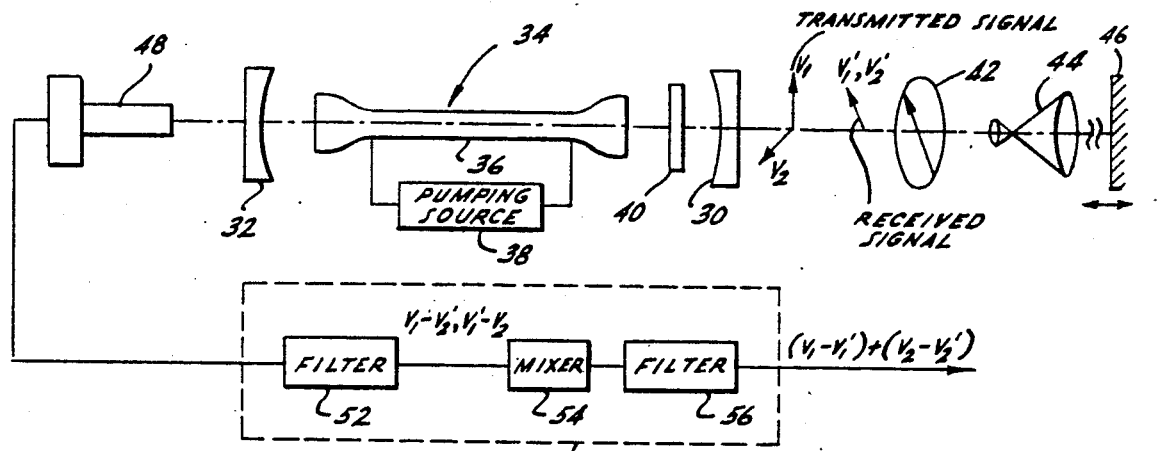
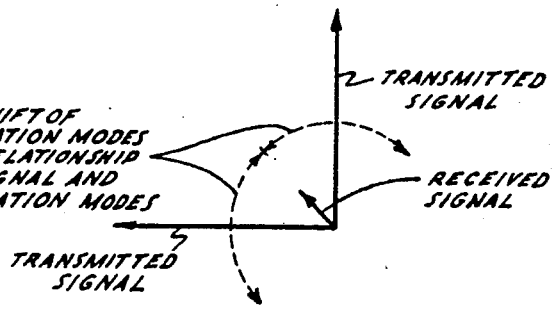
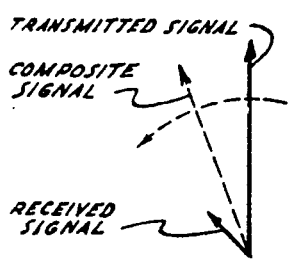
INVENTORS
WALTER M. DOYLE
WESLEY D. GERBER
BY Leonard D. Zalman
ATTORNEY

VARIABLE POLARIZATION OPTICAL HETERODYNE TRANSCEIVER

In copending U.S. Pat. application Ser. No. 726,315, filed May 3, 1968, by W. M. Doyle, M. B. White, G. J. Galassi, E. Reisman and W. D. Gerber, entitled "Autocollimating Optical Heterodyne Transceiver," and assigned to the same assignee as the present invention, there is described optical heterodyne transceiver systems which utilize a single laser as a transmitter, receiver preamplifier, and local oscillator. These systems, which make use of the principle that under certain conditions an oscillating laser will amplify a weak injected signal, offer the advantage not only of preamplification but also of a simple, easily aligned optical system involving the use of common optical components for the receiver and the transmitter.

The chief limitation of the systems described in the above-mentioned application is their dependency for amplification upon a variation in the total laser intensity. For many situations, this variation is masked by the saturation effects of the laser medium.

It is therefore an object of the present invention to provide an optical heterodyne transceiver system which is not dependent for amplification upon a variation in the total laser output intensity.

It is a further object of the present invention to provide an optical heterodyne transceiver system which is insensitive to the effects of laser intensity saturation.

It is a further object of the present invention to provide an optical heterodyne transceiver system which minimizes the effects of local oscillator noise.

In accordance with the present invention, a laser cavity shaped so as not to favor any particular axial mode of oscillation is provided with a weak anisotropy and partially transmissive end reflectors. Energy from one partially transmissive reflector is directed through a polarizing element and the usual output optics of the laser to a target which may frequency modulate the signal incident thereon. The reflected signal (the received signal), which has suffered a phase shift and perhaps frequency modulation passes through the output optics and the polarizing element and back into the laser. If the frequency of the received signal is sufficiently close to the cavity resonant frequency, the received signal shifts the polarization of the laser modes. This produces a polarization modulation of the radiant energy that passes through the other partially transmissive reflector. This polarization modulation is detected by a system located adjacent to the latter reflector which converts the polarization modulation into a corresponding amplitude modulation.

For a better understanding of the present invention together with other and further objects thereof, reference should now be had to the following detailed description which is to be read in conjunction with the accompanying drawings in which:

FIG. 1 is a schematic diagram of one preferred embodiment of the present invention;

FIG. 1A is a polarization vector diagram of the signals produced by the system of FIG. 1;

FIG. 2 is a schematic diagram of another preferred embodiment of the present invention; and FIG. 2A is a polarization vector diagram of the signals produced by the system of FIG. 2.

FIG. 1 is a block diagram of one embodiment of the present invention that can be used for Doppler shift measurement. Two reflectors 2 and 4 define the ends of an optical path extending therebetween. A laser tube 6 is disposed in said path. Typically, laser tube 6 can comprise a plasma tube having fused silica end windows 8 and 10 which are normal or nearly normal to the optical path between reflectors 2 and 4. Plasma tube 6 can include a mixture of helium and neon and, conveniently, the system can operate at the 1.15 micron He-Ne transition. A conventional electrical pumping source 12 is coupled to plasma tube 6 in a conventional manner.

Block 14 represents schematically apparatus for providing the laser cavity with a small transverse anisotropy which can be any combination of linear birefringence and circular birefringence. The linear birefringence can be produced by a retardation plate or an electro-optic cell, such as, for example, a Kerr cell which introduces a known linear birefringence into the laser cavity in response to an electrical signal supplied thereto. The circular birefringence can be produced by a Faraday rotator disposed along the axis of the laser cavity or by a system which applies an axial magnetic field to the plasma tube 6.

Reflectors 2 and 4 are made partially transmissive so that some radiant energy exits the laser cavity through these reflectors. The radiant energy that exits through reflector 2 is intercepted by a polarizing element 16 which has its optical axis oriented at some nonorthogonal angle, typically 45°, to the polarization of the radiant energy incident thereon. The output of the polarizing element 16 is focused by an optical system 18 onto, in this application of the invention, a moving target 20. Polarizing element 16 may be omitted if target 20 is sufficiently diffuse. Target 20 reflects some of the radiant energy incident thereon and optical system 18 directs some of the reflected energy back through polarizing element 16 and reflector 2 into the laser cavity.

The radiant energy that exits the laser cavity through reflector 4 is intercepted by a polarizing element 22 which has its optical axis oriented at some nonorthogonal angle, typically 45°, to the polarization of the radiant energy incident thereon. The output of polarizing element 22 is intercepted by a photodetector 24 which generates an electrical signal having an amplitude proportional to the amplitude of the radiant energy incident thereon.

The operation of the system of FIG. 1 will now be explained in conjunction with the vector diagram shown in FIG. 1A. The small transverse anisotropy developed by the apparatus of block 14 restricts laser mode oscillation to specific states of polarization. For simplicity, it is assumed that the small transverse anisotropy developed by the apparatus of block 14 restricts laser mode oscillation to specific states of polarization. For simplicity, it is assumed that the small transverse anisotropy is produced by a combination of circular birefringence and linear birefringence which restricts the transmitted signal of FIG. 1 to only one mode of oscillation which is assumed further to be vertically polarized as shown in FIGS. 1 and 1A.

Polarizing element 16 polarizes the transmitted signal so that the signal radiated toward target 20 is polarized at some angle, typically 45°, relative to the polarization of the signal exiting through reflector 2. Should the polarization of the former signal change during its transmission to and from target 20, polarizing element 16 restores this signal to its original polarization when it repasses through element 16. Thus, a constant polarization angle is maintained between the transmitted signal, i.e., the signal exiting through reflector 2, and the received signal. This is shown in FIGS. 1 and 1A.

Due to the movement of target 20, a frequency difference is established between the transmitted signal and the received signal. If the frequency of the received signal is sufficiently close to the frequency of the transmitted signal, the former signal will be transmitted by the laser cavity.

Due to the presence of the received signal in the laser cavity, a composite oscillation signal having a polarization shifted from the polarization of the original laser oscillation builds up in the laser cavity as shown in FIGS. 1 and 1A. The polarization shift may be thought of as a pulling of the polarization of the laser oscillation by the received signal. Since the original laser oscillation and the received signal have slightly different frequencies, their relative phase changes with time. When the two signals are in phase the composite oscillation will be pulled toward the received signal. When the two signals are out of phase, the composite oscillation will be pushed away from the received signal. The result is a modulation of the composite oscillation signal polarization at the difference frequency as illustrated in FIG. 1A. This polarization modulated composite signal is converted to an amplitude modulated signal by polarizing element 22. The amplitude modulated signal generated by polarizing element 22 is converted to an amplitude modulated electrical signal by photodetector 24.

Intensity gains as high as 500 have been observed with the system of FIG. 1. The effective gain is dependent in part upon the frequency offset between the transmitted signal and the received signal and upon the degree of anisotropy of the laser cavity. As the degree of anisotropy decreases, the force locking laser oscillations to a particular polarization decreases. Thus, a received signal of a given amplitude will produce a greater polarization modulation in a system having weak anisotropy than it would if the system had a stronger anisotropy.

The effective gain of the laser cavity is dependent also upon the ratio of circular birefringence to linear birefringence developed by the apparatus represented by block 14. As the ratio of circular birefringence to linear birefringence is increased, a ratio is reached where one of the orthogonal stationary oscillation modes of a dual polarization laser is extinguished. Maximum gain is achieved when the ratio of circular birefringence to linear birefringence is just slightly above the ratio which causes one of the normally stationary oscillation modes of a dual polarization laser to be extinguished.

FIG. 2 is a block diagram of a second embodiment of the present invention which can be used also for Doppler shift measurement. Reflectors 30 and 32 define the ends of a conventional dual polarization laser 34 which includes, in addition to reflectors 30 and 32, a plasma tube 36, a pumping source 38, and a weak anisotropic element 40. The structure and operation of dual polarization laser 34 is described in copending U.S. Pat. application Ser. No. 475,757, now Pat. No. 3,500,233, filed July 29, 1965, issued Mar. 10, 1970, and assigned to the same assignee as the present invention.

Some of the radiant energy that exits the laser cavity through reflector 30 is intercepted by a polarizing element 42 which has its optical axis oriented at some nonorthogonal angle to the polarizations of the components of the radiant energy incident thereon. The output of polarizing element 42 is focused by an optical system 44 onto a moving target 46. Polarizing element 42 may be omitted if target 46 is sufficiently diffuse. Target 46 reflects some of the radiant energy incident thereon toward optical system 44 and optical system 44 directs some of this reflected energy back through the polarizing element 42 and the reflector 30 into the laser cavity defined by reflectors 30 and 32.

The only stationary oscillation modes that can be established by dual polarization laser 34 involve light polarized in orthogonal directions. For simplicity, it is assumed that the transmitted signal that exits the laser cavity through reflector 30 is composed of only two orthogonal modes which are assumed further to be vertically and horizontally polarized and at frequencies $V_1$ and $V_2$, respectively, as shown in FIG. 2. As a result of the movement of target 46, the Doppler shift frequencies of these modes as components of the received signal are $V_1'$ and $V_2'$. Polarizing element 42 polarizes the transmitted signal so that the signal radiated toward target 46 is neither horizontally or vertically polarized. Should the polarization of the latter signal change during its transmission to and from target 46, polarizing element 42 restores this signal to its original polarization. Thus, a constant polarization angle is maintained between the transmitted signal and the received signal. Due to the frequency difference between the received signal and the normal laser oscillations, the polarization angle between the pulled laser oscillations varies with time. That is, the two oscillations approach each other from the normal 90° position when they are in phase with the received signal and repel each other to a polarization difference of greater than 90° when they are out of phase with the received signal.

The light energy that exits the laser cavity through reflector 32 is intercepted by a photomixer 48 which will not normally sense the beat between the horizontally and vertically polarized modes because they are normally orthogonally oriented. However, due to the shifting or pulling of the polarizations of the laser modes from their normal orthogonal relationship by the received signal, photomixer 48 will produce strong high frequency beats at the difference frequencies $V_1-V_2$ and $V_1'-V_2$ when the received signal is injected into the laser cavity. The desired signals $V_1-V_1$ and $V_2-V_2$ are not produced directly by photomixer 48 because of the absence of a polarization analyzer.

A conventional signal-heterodyning system 50, which may include cascade connected radio frequency filter 52, mixer 54 and audio frequency filter 56, extracts, in a conventional manner, the desired audio frequency difference signals $V_1'-V_1'$ and $V_2-V_2'$, from the beat signals at $V_1-V_2'$ and $V_1'-V_2$. Since the system of FIG. 2 has a relatively high intermediate frequency, this system, in addition to providing high gain, filters out any low frequency noise generated by the laser local oscillator.

Although the invention has been described with particular reference to Doppler shift measurement, the invention can be used for ranging, interferometry and as a communication system. Ranging information can be gathered by periodically sweeping the mode frequencies of the laser as by affixing a piezoelectric transducer to one of the laser cavity mirrors. Accordingly, it is desired that the scope of the invention is defined only by the appended claims.

We claim:

1. A laser system comprising first and second spaced reflectors positioned to define a closed optical path therebetween, a laser plasma tube disposed in said path, shaped so as not to favor any particular axial mode of oscillation, and constructed to emit light of any polarization produced by any such mode, first means for introducing anisotropy into said closed optical path, said tube having oscillation modes the polarizations of which are determined by said first means, said first and second reflectors being partially transmissive whereby radiant energy exits said path through both reflectors, means for directing toward a target radiant energy exiting said closed optical path through said first reflector and for directing toward said first reflector a portion of said directed radiant energy reflected by said target, thereby to cause some of said portion of said reflected radiant energy to enter said laser plasma tube, and second means in the path of said radiant energy exiting said closed optical path through said first reflector for producing a difference in polarization between said reflected radiant energy and said oscillation modes of said tube whereby said reflected radiant energy entering said laser plasma tube acts to change the polarization of at least one of said oscillation modes and consequently radiant energy exiting said closed optical path through said second reflector is varied in polarization by said reflected radiant energy.

2. The system of claim 1 further comprising third means for transforming said polarization varied radiant energy exiting said closed optical path through said second reflector into an amplitude-varied output signal.

3. The system of claim 2 wherein said second means is a diffuse target.

4. The system of claim 2 wherein said second and third means are polarizers.

5. The system of claim 2 further comprising photodetector means positioned to intercept said output signal of said third means.

6. The system of claim 5 wherein said first means for introducing anisotropy into said closed optical path comprises means for providing both linear birefringence and circular birefringence in said closed optical path.

7. The system of claim 6 wherein said birefringence-providing means provides circular birefringence and linear birefringence in such ratio as to cause one of said oscillation modes of said laser tube to become extinguished.

8. The system of claim 1 further comprising photomixer means, located so as to receive said radiant energy exiting said path through said second reflector and to produce an output signal in response thereto, and signal heterodyning means supplied with and responsive to the latter output signal to produce a heterodyne signal.